May 27, 1952  R. F. A. V. D'AVITAYA  2,598,364

FILM GATE FOR MOTION-PICTURE PROJECTORS

Filed March 29, 1949

Inventor
R. F. a. V. d'Avitaya
by

Patented May 27, 1952

2,598,364

UNITED STATES PATENT OFFICE 2,598,364

FILM GATE FOR MOTION-PICTURE PROJECTORS

Raymond Fernand Adrien Valentin d'Avitaya, Marseille, France

Application March 29, 1949, Serial No. 84,034
In France May 7, 1948

3 Claims. (Cl. 88—17)

My invention relates to improvements in film gates for motion picture projectors, such film gates being mounted between the objective and the shutter of the projector. They are provided with apertures for the pencil of projection light beams and are adapted to receive the film passing therethrough and to maintain the same in a vertical plane relative to the projection axis. The film is fed into the film gate for example by a continuously operating sprocket and is intermittently drawn therethrough by claws or similar means. My invention refers more particularly to such film gates of the type indicated before which are composed of two cooperating members namely a frontal guide plate opposing the objective and a rear guide or pressure plate opposing the shutter thereof.

It is an object of my invention to adapt said guide plates forming the film gate in such manner that the film while passing therethrough is gradually curved in lateral direction to make its surface correspond with the focal field of the objective.

Another object of my invention is to provide an improved film gate in which the film is not only firmly guided but also safely protected from sudden stresses and against injury particularly to its coated surface.

Additional objects, features and advantages of my invention will be more fully understood from the following description when read with the accompanying drawing in which one embodiment of my improved film gate is illustrated.

In the drawing Fig. 1 is a longitudinal sectional view of the frontal guide plate forming part of the film gate;

Fig. 2 is an elevational view of said frontal plate showing its forward face opposing the objective of the projector;

Fig. 2' is a cross-sectional view taken along line x—x' in Fig. 2;

The same reference characters indicate the same parts in all figures of the drawing.

Figure 1:
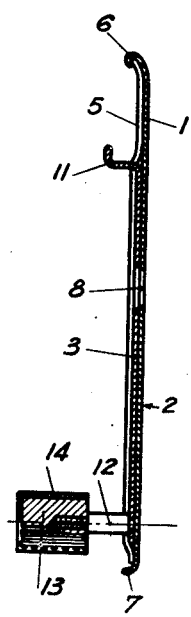

As used herein and in the appended claims the words "front," "frontal," "forward," "outward" and words cognate thereto mean or refer to a direction conforming to the direction of the light beams passing through the shutter of the projector toward the objective thereof, and conversely words like "rear," "backward," "inward" and words cognate thereto mean or refer to the contrary direction.

The film guide is composed of a frontal guide plate 1 which lies nearer to the objective of the projector and of a rear guide or pressure plate 15 which is nearer to the shutter of the projector. Such plates are preferably stamped from sheet metal and their surfaces such as 2 of plate 1 which are in contact with the film 27 are appropriately plated and polished to minimize friction. Each of said plates 1 and 15 is provided with an aperture 8 and 22, respectively, to permit the projecting light beams to pass through the film. The said plates also have coinciding marginal recesses 9 and 23, respectively, to permit driving claws to engage the film to draw the same through the gate.

Figure 2:
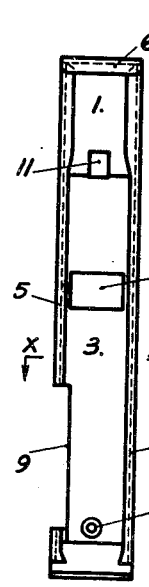

The frontal guide plate 1 as illustrated in Figs. 1, 2 and 2' is reinforced in its central and lower portion on the forward side by a sheet metal body 3 attached thereto by the marginal folds 4 and 5. Said reinforcing sheet metal body 3 is provided with a hook 11 and with a projecting stud 12 which supports a head 13. Said hook 11 and said head 13 are adapted to engage corresponding recesses in the projector frame in order to fix the frontal guide plate 1 therein. To facilitate such mounting in a dark or insufficiently illuminated room said head 13 may be provided with a coating 14 of a white or preferably luminescent material.

Figure 7:
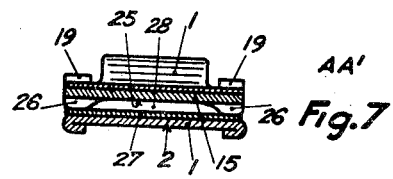
Figs. 7, 8 and 9 are cross-sectional views taken on lines A—A', B—B' and C—C', respectively, of Fig. 6.
Figure 8:
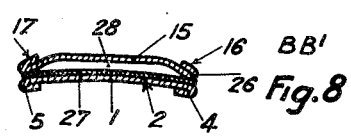
Figure 9:
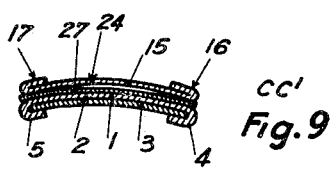

The back face 2 of the frontal guide plate 1 contacting the film 27 is flat in its upper portion (Fig. 7) which receives the incoming film and gradually passes into a convex portion formed by bending back the marginal portions of the plate out of the plane of said flat surface portion. Thus the film gliding upon the surface 2 is laterally curved to make its surface correspond with the focal field of the objective.

Figure 3:
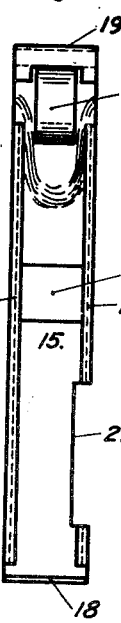
Fig. 3 is an elevational view of the rear guide or pressure plate showing its back face opposing the shutter of the projector.
Figure 4:
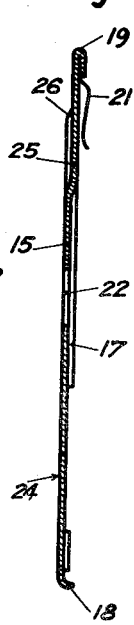
Fig. 4 is a longitudinal sectional view thereof.
Figure 5:
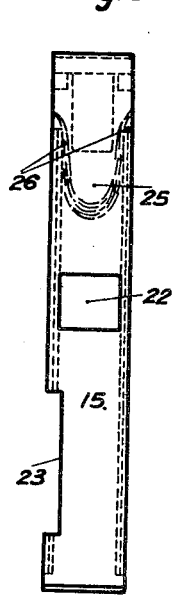
Fig. 5 is an elevational view thereof showing its forward face opposing the coated surface of the film.
Figure 6:
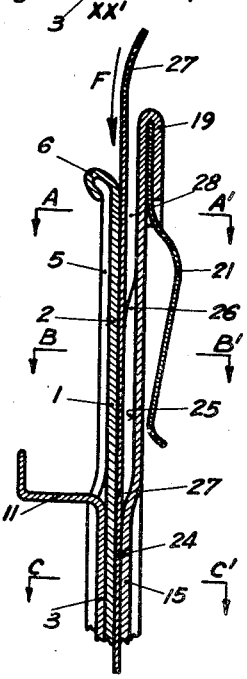
Fig. 6 shows in an enlarged scale the upper portions of the frontal guide plate and of the rear guide or pressure plate in assembled operative relation.

The rear guide or pressure plate 15 shown in Figs. 3, 4 and 5 cooperates with the frontal guide plate 1 as illustrated in Figs. 6, 7, 8 and 9. Said rear guide plate 15 may be stamped from sheet metal and is provided with marginal folds 16 and 17 to reinforce the same. A flat spring or other hooklike member 21 serves to suspend the plate 15 in the projector frame. The upper surface portion 25 of said plate 15 where the film is received is flat and distanced from the opposing flat upper portion 2 of the frontal guide plate 1 and is provided with marginal ribs 26 gradually rising therefrom to contact the marginal portions of the film 27 and to press the same against the edge portions of the front plate 1. These two marginal ribs 26 may be connected to form a U as shown in the drawing. The said flat surface portion 25 of the rear guide plate 15 passes into a portion 24 concavely bent against the film with a smaller radius of curvature than the opposite convexly bent portion of the frontal guide plate 1 thus leaving an interstice 28 therebetween. The said flat surface portion 25 of the guide plate 15 lies essentially in the same plane as the longitudinal center line of the adjoining concave portion 24 and the said marginal ribs 26 pass into the marginal portions 16, 17 of the plate 15 as apparent from Figs. 7, 8 and 9.

It will be well understood that the film 27 while passing through the film gate in the direction of arrow F will safely glide along the frontal guide plate 1 and will be pressed against the same only with its marginal portions by the action of the rear guide or pressure plate 15, thus permitting a smooth and safe operation.

While I have illustrated and described one embodiment of my invention it is obvious that it may be otherwise constructed without departing from the spirit and scope of my invention as defined in the appended claims.

What I claim as my invention is:

1. A film gate for film projecting apparatus, comprising in combination a longitudinal frontal guide plate and a longitudinal rear guide or pressure plate cooperating therewith; said plates conforming to the film passing in between and each having a projection opening in its middle portion coaxial with the optical center line of the projection light beam; the film contacting surface of said frontal plate being flat in its film receiving upper portion and gradually passing into a convex surface in the middle portion thereof; said convex surface portion having its marginal portions bent back out of the plane of said flat surface portion; the film contacting middle surface portion of said rear plate being concavely bent with a smaller radius of curvature than the opposite convex surface portion of said front plate to contact the film along its marginal edges; the film receiving upper surface portion of said rear plate being flat essentially in the same plane as the longitudinal center line of its concave middle surface portion and spaced from the opposite flat surface portion of the front plate; and longitudinal marginal ribs on the flat surface portion of the rear plate to contact the film and to hold the same against the edges of the front plate; said ribs gradually rising from the said flat surface portion in the direction of the film motion and finally merging with the concave surface of the middle portion of the rear plate.

2. A film gate according to claim 1 wherein said ribs on the flat portion of the rear plate are formed by bent edges thereof.

3. A film gate according to claim 1 wherein the ribs at their ends merging into the concave surface of the middle portion of the rear plate are connected to a U-form.

RAYMOND FERNAND ADRIEN
VALENTIN D'AVITAYA.

REFERENCES CITED

The following references are of record in the file of this patent:

UNITED STATES PATENTS

| Number | Name | Date |
| --- | --- | --- |
| 1,859,435 | De Forest | May 24, 1932 |
| 1,862,364 | Heisler | June 7, 1932 |
| 1,888,527 | Edouart | Nov. 22, 1932 |
| 2,036,428 | Mihalyi | Apr. 7, 1936 |
| 2,277,695 | Foster | Mar. 31, 1942 |
| 2,427,327 | Nemeth | Sept. 9, 1947 |

FOREIGN PATENTS

| Number | Country | Date |
| --- | --- | --- |
| 235,992 | Great Britain | July 2, 1925 |